(12) United States Patent
Plate (10) Patent No.: US 8,839,487 B2
(45) Date of Patent: Sep. 23, 2014

(54) VERTICALLY ADJUSTABLE CASTER WHEEL APPARATUS

(71) Applicant: Ross Design & Engineering, Inc., Somerset, MI (US)

(72) Inventor: Jack Plate, Clark Lake, MI (US)

(73) Assignee: Ross Design & Engineering, Inc., Somerset, MI (US)

( * ) Notice: Subject to any disclaimer, the term of this patent is extended or adjusted under 35 U.S.C. 154(b) by 0 days.

(21) Appl. No.: 14/058,861

(22) Filed: Oct. 21, 2013

(65) Prior Publication Data

US 2014/0109341 A1 Apr. 24, 2014

Related U.S. Application Data

(60) Provisional application No. 61/716,040, filed on Oct. 19, 2012.

(51) Int. Cl.
| | | |
|---|---|---|
| A47B 91/00 | (2006.01) | |
| B60B 33/00 | (2006.01) | |
| B60G 17/02 | (2006.01) | |
| F16F 1/44 | (2006.01) | |
| B60B 33/04 | (2006.01) | |
| B66F 9/075 | (2006.01) | |

(52) U.S. Cl.
CPC ......... *B60B 33/045* (2013.01); *B60G 2300/022* (2013.01); *B60B 2900/711* (2013.01); *B60G 17/02* (2013.01); *F16F 1/44* (2013.01); *B60B 33/04* (2013.01); *B60B 33/0068* (2013.01); *B60B 2900/351* (2013.01); *F16F 2224/025* (2013.01); *B66F 9/07586* (2013.01); *B60B 2360/324* (2013.01); *B60B 33/0049* (2013.01); *B60B 2900/313* (2013.01); *B60B 33/0039* (2013.01); *B60B 2310/305* (2013.01); *B60G 2202/143* (2013.01); *F16F 2230/0005* (2013.01); *B62B 2301/04* (2013.01); *B60Y 2200/15* (2013.01); *B60B 2360/50* (2013.01)
USPC ............................................... 16/44; 16/32

(58) Field of Classification Search
USPC ...... 16/44, 35 D, 35 R; 188/1.12, 281, 282.1, 188/282.5, 282.6; 280/250.1, 86.1, 483, 280/485; 180/21; 267/153, 195, 196, 257, 267/258, 292, 293
See application file for complete search history.

(56) References Cited

U.S. PATENT DOCUMENTS 1,835,144 A * 12/1931 Cleaveland ........................ 16/34
2,227,875 A * 1/1941 Boden ................................ 16/44

(Continued)

FOREIGN PATENT DOCUMENTS

| AU | 2009100069 | 3/2009 |
| DE | 295 01 456 U1 | 3/1995 |

(Continued)

*Primary Examiner* — Chuck Mah
(74) *Attorney, Agent, or Firm* — Young Basile Hanlon & MacFarlane P.C.

(57) ABSTRACT

A vertically-adjustable caster wheel apparatus for use on a forklift truck, material handling cart, and the like. The caster wheel apparatus of the present invention provides a yolk frame having a pivot pin connected to and extending through the yolk frame. A wheel frame has one end pivotally connected to the yolk frame and a second end rotatably connected to a wheel. An elastic member has a first retainer connected to one end of the elastic member and a second retainer connected to an opposite end of the elastic member, wherein the first retainer is connected to the pivot pin in the yolk frame to allow the elastic member to pivot with respect to the yolk frame. Means for adjusting the vertical height of the wheel is provided by adjusting the angle of the wheel frame relative to the yolk frame.

16 Claims, 6 Drawing Sheets

(56) References Cited

U.S. PATENT DOCUMENTS

| | | | |
|---|---|---|---|
| 2,494,019 A * | 1/1950 | Ware, Jr. | 280/11.28 |
| 2,507,980 A * | 5/1950 | Knapp | 280/124.128 |
| 2,661,206 A | 12/1953 | Gregoire | |
| 2,707,795 A * | 5/1955 | Skupas | 16/44 |
| 2,738,542 A * | 3/1956 | Clark, Jr. | 16/44 |
| 2,885,720 A * | 5/1959 | Seeberger | 16/44 |
| 4,763,910 A * | 8/1988 | Brandli et al. | 280/29 |
| 4,895,355 A * | 1/1990 | Wolf et al. | 267/257 |
| 5,036,941 A | 8/1991 | Denzin et al. | |
| 5,123,625 A * | 6/1992 | Spaltofski | 248/634 |
| 5,347,680 A | 9/1994 | Rippe | |
| 5,400,469 A | 3/1995 | Simonsen | |
| 6,149,169 A * | 11/2000 | Chelgren | 280/86.1 |
| 6,279,199 B1 * | 8/2001 | Plate | 16/19 |
| 6,425,161 B1 | 7/2002 | LeMeur, Jr. et al. | |
| 6,460,641 B1 | 10/2002 | Kral | |
| 6,499,184 B2 | 12/2002 | Plate | |
| 6,543,798 B2 * | 4/2003 | Schaffner et al. | 280/250.1 |
| 6,568,030 B1 * | 5/2003 | Watanabe et al. | 16/44 |
| 6,892,421 B2 | 5/2005 | Cooper et al. | |
| 7,093,319 B2 | 8/2006 | Lemeur, Jr. et al. | |
| 2002/0084608 A1 * | 7/2002 | Marshburn | 280/79 |
| 2004/0055108 A1 | 3/2004 | Lemeur, Jr. et al. | |
| 2004/0111830 A1 * | 6/2004 | Cooper et al. | 16/44 |
| 2006/0117524 A1 * | 6/2006 | Yan | 16/44 |
| 2007/0143957 A1 * | 6/2007 | Baek | 16/44 |
| 2009/0205164 A1 | 8/2009 | Larson | |
| 2011/0162166 A1 | 7/2011 | Cooper et al. | |

FOREIGN PATENT DOCUMENTS

| | | | |
|---|---|---|---|
| DE | 197 41 742 A1 | | 4/1999 |
| DE | 197 53 411 A1 | | 6/1999 |
| DE | 197 53 412 A1 | | 6/1999 |
| DE | 201 00 404 U1 | | 3/2001 |
| EP | 0 296 326 A2 | | 12/1988 |
| FR | 852 602 A | | 2/1940 |
| FR | 2 399 328 A1 | | 3/1979 |
| GB | 2187687 A | * | 9/1987 |
| JP | S56 60707 A | | 5/1981 |
| JP | H06 127201 A | | 5/1994 |
| JP | 2001 001705 A | | 1/2001 |
| JP | 2001001705 A | * | 1/2001 |
| JP | 2001 277807 A | | 10/2001 |
| JP | 2004034859 A | * | 2/2004 |
| JP | 2008307916 A | * | 12/2008 |
| JP | 2010149653 A | * | 7/2010 |
| JP | 2012101650 A | * | 5/2012 |
| JP | 2012 116336 A | | 6/2012 |
| KR | 2002073103 | | 9/2002 |

* cited by examiner

VERTICALLY ADJUSTABLE CASTER WHEEL APPARATUS

CROSS-REFERENCE TO RELATED APPLICATIONS

This application claims the benefit of U.S. Provisional Patent Application No. 61/716,040, which was filed on Oct. 19, 2012, and is incorporated herein by reference in its entirety.

FIELD OF THE INVENTION

The present invention relates to the field of adjustable caster wheels, and in particular, a caster wheel having a polyurethane cylinder for absorbing high levels of forces realized by the caster wheel while also providing a vertical adjustment of the caster wheel without having to fully disassemble and reassemble the caster wheel.

BACKGROUND OF THE INVENTION

Heavy-duty caster wheels are well-known within the industry, especially the forklift truck industry. Such heavy-duty casters are used to support relatively heavy loads transported by small forklift trucks, material handling carts, and the like. Such heavy-duty caster wheels commonly use various biasing means or elastomeric means to absorb high levels of forces or loads applied to the roller or wheel of the caster wheel. Such biasing means and elastomeric means improve the load bearing capability of the caster wheel resulting in smoother operation of the caster wheel, ease of movement of the caster supported truck or vehicle, and improved truck travel operation due to the reduced wear of the caster wheel.

Previous caster wheel designs have utilized various forms of the biasing means and the elastomeric means. For instance, steel compression or torsional coil springs have been used to bias resiliently supported casters, but such springs are relatively large and heavy and not readily adaptable for many caster wheel installations, wherein the overall vertical dimension available for the caster wheel is limited, and the vertical profile of the caster wheel assembly must be concise. In addition, such springs are typically expensive, thereby leading to inefficiencies that are undesirable in the caster wheel industry.

Other known designs have implemented polyurethane blocks as a means for absorbing compressive loads applied to the roller or wheel of the caster wheel. Such designs are typically less expensive than the above-noted steel compression or torsional coil springs; however, such polyurethane blocks typically break down after extended use and cycled loads, thereby requiring replacement and/or repair of the caster wheel.

Heavy duty caster wheel assemblies also lack a quick and simple method of vertically adjusting the roller or wheel height of the caster wheel assembly. To provide vertical adjustment of the roller or wheel of the caster wheel assembly, many caster wheel assemblies require that the roller or wheel be disassembled and reassembled onto a different rotational axis provided on the caster wheel assembly. Other designs require a partial or complete disassembly and reassembly of the caster wheel assembly in order to provide vertical adjustment of the roller or wheel of the caster wheel assembly.

It would be desirable to provide a heavy-duty caster wheel assembly that provided a simple and efficient method for providing vertical adjustment of the roller or wheel of the caster wheel assembly while also providing an inexpensive and high-quality elastomeric or biasing means for absorbing heavy loads to a heavy-duty caster wheel assembly.

SUMMARY OF THE INVENTION

The present invention provides a vertically adjustable caster wheel apparatus for use on various forklift trucks, material handling carts, and the like. The caster wheel apparatus of the present invention provides a yolk frame having a pivot pin connected to and extending through the yolk frame. A wheel frame has one end pivotally connected to the yolk frame and a second end rotatably connected to a wheel. An elastic member has a first retainer connected to one end of the elastic member and a second retainer connected to an opposite end of the elastic member, wherein the first retainer is connected to the pivot pin of the yolk frame to allow the elastic member to pivot with respect to the yolk frame. Means for adjusting the vertical height of the wheel is provided by adjusting the angle of the wheel frame relative to the yolk frame.

The adjusting means may provide the second retainer with a threaded aperture extending there through along a longitudinal axis. A swivel plate is coupled to the wheel frame and has a threaded aperture extending there through and coaxial with the longitudinal axis. A threaded fastener releasably engages the threaded aperture in the swivel plate and the threaded aperture in the second retainer. A spacer is positioned between the second retainer and the swivel plate for adjusting the vertical height of the wheel by adjusting the angle of the wheel frame relative to the yolk frame. The spacer may include at least one washer having an aperture for receiving the threaded aperture. The swivel plate may have a pair of rods that are received by a pair of apertures in the wheel frame to allow rotation of the swivel plate relative to the wheel frame.

In another embodiment, the adjusting means may provide the second retainer with a threaded aperture extending there through along a longitudinal axis. A floating retainer coupled to the wheel frame may have a threaded aperture extending there through coaxial with the longitudinal axis. A lock nut is connected to the floating retainer and has a threaded aperture coaxial with the longitudinal axis. A threaded fastener is received by the threaded aperture in the floating retainer, the lock nut, and the second retainer, wherein the threaded fastener may be rotated to adjust the vertical height of the wheel by adjusting the angle of the wheel frame relative to the yolk frame. A set screw may be releasably received by a threaded aperture in the floating retainer, and the set screw may be movable between a locked position, wherein the set screw engages a recess in the threaded fastener to prevent the threaded fastener from rotating, and an unlocked position, wherein the set screw does not engage the recess in the threaded fastener thereby allowing the threaded fastener to rotate and adjust the vertical height of the wheel by adjusting the angle of the wheel frame relative to the yolk frame. The floating retainer may have a pair of rods received by a pair of apertures in the wheel frame to allow rotation of the floating retainer relative to the wheel frame.

The caster wheel apparatus of the present invention may include a swivel bearing assembly coupled to the yolk frame for rotatably supporting the yolk frame.

The elastic member of the caster wheel apparatus may be fabricated from a polyurethane material. The elastic member may also comprise at least one substantially cylindrical polyurethane material.

The elastic member may have a substantially cylindrical configuration having an aperture extending there through along a longitudinal axis. The first retainer is received by the aperture at one end of the elastic member, and the second retainer is received by the aperture at the opposite end of the elastic member. The first retainer and second retainer are spaced in the aperture of the elastic member when the elastic member is not extensively compressed, and the first and second retainers engage one another in the aperture of the elastic member when the elastic member is extensively compressed. The first and second retainers may each have an annular protuberance extending therefrom, and the first retainer and the second retainer have the annular protuberance press fit into the aperture of the elastic member to prevent the movement of the first retainer and the second retainer relative to the elastic member.

BRIEF DESCRIPTION OF THE DRAWINGS

The various features, advantages and other uses of the present apparatus will become more apparent by referring to the following detailed description and drawings in which.

DETAILED DESCRIPTION OF THE EMBODIMENTS

The present invention provides a vertically-adjustable caster wheel apparatus 10 for use on various types of vehicles, including, but not limited to, forklift trucks (not shown), material handling carts (not shown), and the like. As seen in FIGS. 1-6, the caster wheel apparatus 10 provides a swivel bearing assembly 12 that is connected to a vehicle (not shown). A yolk frame 14 is rotatably connected to the swivel bearing assembly 12 and is pivotally connected to a wheel frame 16 through the use of a hinge pin 18. A wheel or roller 20 is rotatably connected to the wheel frame 16 by an axle 22. An elastic compression assembly 24 is pivotally connected to the yolk frame 14 and connected to a means for adjusting 26 the vertical height of the wheel 20. The vertical height adjusting means 26 is in turn connected to the wheel frame 16. The elastic compression assembly 24 assists in absorbing loads and forces applied to the wheel 20 of the caster wheel apparatus 10 so as to improve the performance of the caster wheel apparatus 10. The vertical height adjusting means 26 allows for the adjustment of the angle between the wheel frame 16 and the yolk frame 14, thereby adjusting the vertical height of the wheel 20 relative to the vehicle. The vertical height adjusting means 26 provides vertical height adjustment of the wheel 20 without having to completely disassemble and reassemble the caster wheel apparatus 10.

The swivel bearing assembly 12 of the caster wheel apparatus 10 allows the caster wheel apparatus 10 to rotate with respect to the vehicle. In the alternative (not shown), the caster wheel apparatus 10 may be rigidly connected to the vehicle so that the caster wheel apparatus does not rotate with respect to the vehicle. The swivel bearing assembly 12 provides a substantially rectangular mounting plate 28 having four apertures 30 extending therethrough. Conventional fasteners (not shown) may be inserted through the apertures 30 in the mounting plate 28 and into the vehicle to secure the mounting plate 28 to the vehicle. A substantially cylindrical casing 32 is connected to and extends outward from the mounting plate 28 of the swivel bearing assembly 12. A swivel bearing 34 is mounted within an arcuate recess provided within the cylindrical casing 32. The swivel bearing 34 and the cylindrical casing 32 receive a substantially cylindrical portion 36 of the yolk frame 14, thereby securing the yolk frame 14 to the swivel bearing assembly 12 while also allowing the yolk frame 14 and the remaining portion of the caster wheel apparatus 10 to rotate with respect to the swivel bearing assembly 12 and the vehicle.

In order to assist in supporting the loads and forces to the caster wheel apparatus 10, the yolk frame 14 provides a substantially U-shaped configuration having a bottom side 38 and a pair of substantially parallel side walls 40 integrally connected to and extending away from the bottom side 38 of the yolk frame 14. The underside of the bottom side 38 of the yolk frame 14 is connected to the cylindrical portion 36 of the yolk frame 14 which is received by the swivel bearing 34 of the swivel bearing assembly 12, as previously described. The side walls 40 of the yolk frame 14 may have a substantially J-shaped configuration such that a pair of flanges or short side of the J-shaped configurations 41 rise from the bottom side 38 of the yolk frame 14, as seen in FIGS. 1-5. Alternatively, the side walls 40 of the yolk frame 14 may be substantially straight, wherein a pair of bosses 43 may be connected to an inside surface of the side walls 40 of the yolk frame 14, as seen in FIG. 6. The side walls 40 of the yolk frame 14 each have a pair of apertures 42, 44 extending through the side walls 40, wherein the apertures 42, 44 are coaxially aligned in each of the side walls 40 of the yolk frame 14. The apertures 42 may extend through the flanges 41, as seen in FIGS. 1-5, or the bosses 43, as seen in FIG. 6, and the apertures 44 may extend through the side walls 40 of the yolk frame 14. Each set of apertures 42, 44 receives a pivot pin 46, 48 that extends across the yolk frame 14 through each of the pair of apertures 42, 44. The pivot pins 46, 48 may be secured to the yolk frame 14 through conventional means, such as providing a tab 50 connected to one end of the pivot pins 46, 48 and inserting a conventional fastener 52 through an aperture 54 provided in the tab 50 of the pivot pins 46, 48. The fasteners 52 may be received by a threaded aperture (not shown) in the side walls 40 of the yolk frame 14.

The pivot pin 46 may secure the elastic assembly 24 to the yolk frame 14 by having the pivot pin 46 extend through a substantially first cylindrical portion 56 of a lower retainer 58 of the elastic assembly 24. The lower retainer 58 of the elastic assembly 24 has a second substantially cylindrical portion 60 connected to the first cylindrical portion 56. The first cylindrical portion 56 of the lower retainer 58 has a longitudinal axis that is coaxial with a longitudinal axis of the pivot pin 46, whereas the second cylindrical portion 60 of the lower retainer 58 has a longitudinal axis that is perpendicular to the longitudinal axis of the first cylindrical portion 56. By having the lower retainer 58 mounted to the pivot pin 46, the elastic assembly 24 may pivot on the pivot pin 46, as will be described further herein.

To support the wheel 20 of the caster wheel apparatus 10, the wheel frame 16 provides a pair of opposing and substantially parallel plates 62. The plates 62 have a pair of coaxially aligned apertures 64 extending therethrough for receiving the pivot pin 48 of the yolk frame 14. The pivot pin 48 allows the wheel frame 16 to pivot with respect to the yolk frame 14. At the opposite end of the plates 62, the wheel frame 16 provides an additional pair of coaxially-aligned apertures 66 extending through the plates 62. The apertures 66 receive the axle 22 of the wheel 20 for rotatably supporting the wheel 20 with respect to the wheel frame 16. A set of bearings 68 and washers 70 may be provided on each side of the wheel 20 and mounted to the axle 22 to assist in the rolling of the wheel 20 with respect to the axle 20.

In order to absorb the loads and forces realized by the wheel 20 of the caster wheel apparatus 10, the elastic assembly 24 includes a substantially cylindrical elastic member, such as a polyurethane tube 74, that is press fit onto the cylindrical portion 60 of the lower retainer 58. It is also anticipated that the elastic member 74 may take on different shapes and configurations and comprise a plurality of elastic members 74 stacked in a gang type application to create different spring rates of the elastic member 74. The cylindrical portion 60 of the lower retainer 58 may include a raised protuberance 75 for maintaining the lower retainer 58 on the polyurethane tube 74 after being press fit into a corresponding annular recess provided in the polyurethane tube 74. The lower retainer 58 includes a base portion 72 which extends outward from the cylindrical portion 60 of the lower retainer 58 such that one end of the polyurethane tube 74 abuts the base portion 72 of the lower retainer 58. At the opposite end of the polyurethane tube 74, an upper retainer 76, similar to the lower retainer 58, is press fit into the opposite end of the polyurethane tube 74. The upper retainer 76 also has a raised protuberance 77 for maintaining the upper retainer 76 within the polyurethane tube 74 after being press fit into a corresponding annular recess provided in the polyurethane tube 74. The upper retainer 76 also has a substantially cylindrical portion 78 that is received by the polyurethane tube 74 and a base portion 80 that abuts the end of the polyurethane tube 74. The cylindrical portion 78 of the upper retainer 76 has a threaded aperture 81 extending through the upper retainer 76 along a longitudinal axis of the upper retainer 76. By press fitting the upper retainer 76 and the lower retainer 58 into the elastic member 74, the elastic member 74 may be utilized for both retention and compression of the caster wheel apparatus 10.

It is important to note that the end of the cylindrical portion 78 of the upper retainer 76 and the end of the cylindrical portion 60 of the lower retainer 58 are spaced within the polyurethane tube 74. When relatively stable and average loads are applied to the wheel 20 of the caster wheel apparatus 10, the polyurethane tube 74 is not extensively compressed thereby maintaining the spacing between the ends of the lower retainer 58 and the upper retainer 76. However, when significantly high loads are applied to the wheel 20 of the caster wheel apparatus 10, the polyurethane tube 74 extensively compresses, thereby allowing the ends of the cylindrical portion 78 of the upper retainer 76 and the cylindrical portion 60 of the lower retainer 58 to engage and abut one another to prevent the polyurethane tube 74 from being overloaded. This prevents the polyurethane tube 74 from realizing forces that may break down and damage the polyurethane tube 74, thereby causing the polyurethane tube 74 to be replaced. The engagement of the ends of the upper retainer 76 and the lower retainer 58 under significant loads prevents the breaking down or the failure of the polyurethane tube 74. This reduces the maintenance required of the caster wheel apparatus 10, thereby increasing the efficiency of the caster wheel apparatus 10.

Figure 1:
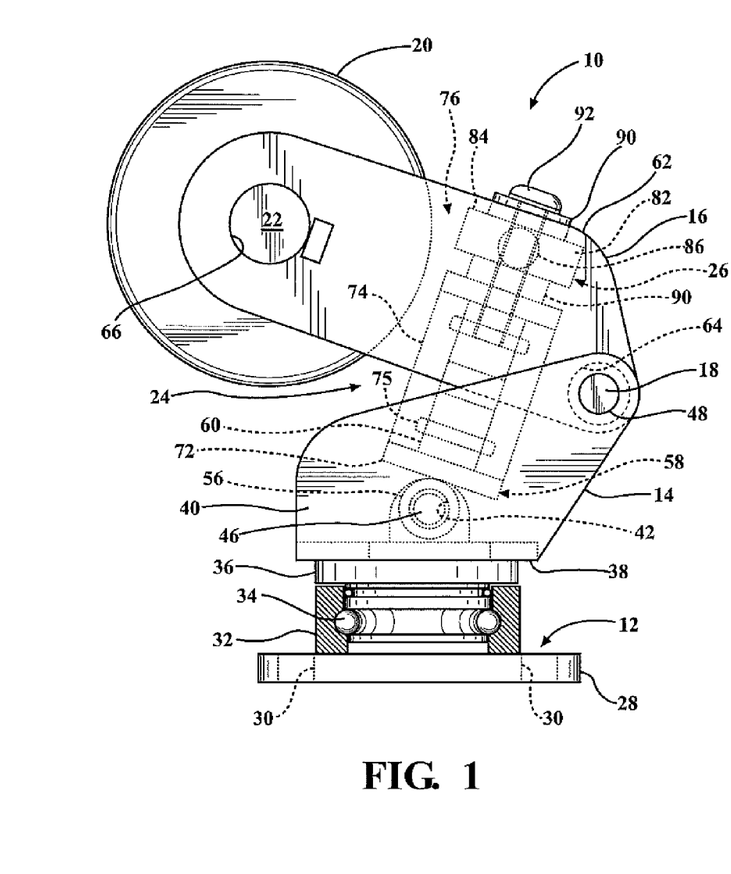
FIG. 1 is a front plan view of the caster wheel apparatus of the present invention showing a first embodiment of the vertical height adjusting means.
Figure 2:
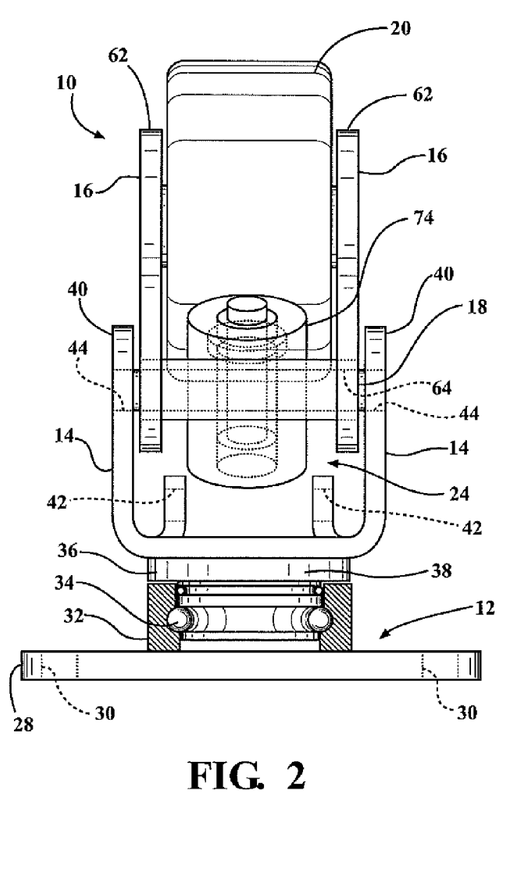
FIG. 2 is a side view of the caster wheel apparatus of the present invention showing the first embodiment of the vertical height adjusting means.
Figure 3:
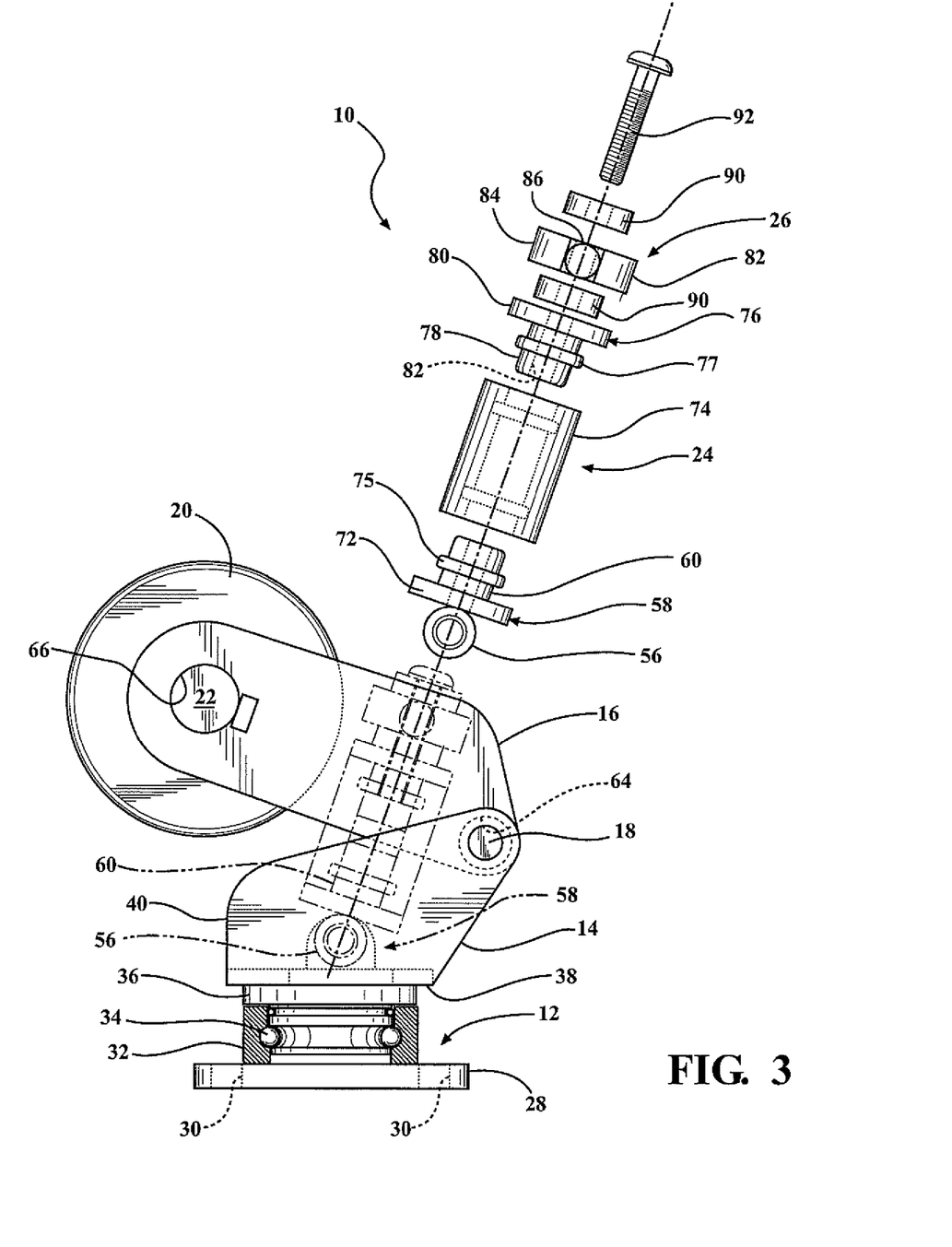
FIG. 3 is an exploded view of the caster wheel apparatus of the present invention showing the first embodiment of the vertical height adjusting means.

To provide vertical adjustment of the wheel 20 of the caster wheel apparatus 10, a first embodiment of the vertical adjusting means 26 of the caster wheel apparatus 10 is shown in FIGS. 1-3. To connect the elastic assembly 24 to the wheel frame 16, the vertical adjusting means 26 provides a swivel plate 82 having a substantially cylindrical body portion 84 with a threaded aperture extending therethrough. A pair of substantially cylindrical rods 86 extend integrally outward from the cylindrical portion 84 of the swivel plate 82. The rods 86 of the swivel plate 82 are received by a pair of coaxially aligned apertures 88 provided in the plates 62 of the wheel frame 16. Steel washers or spacers 90 may be inserted on one or both sides of the swivel plate 82 and are placed atop the upper retainer 76 of the elastic assembly 24. A threaded fastener or bolt 92 is inserted through the steel washers 90 and threaded through the threaded apertures in the cylindrical portion 84 of the swivel plate 82 and into the threaded aperture provided in the cylindrical portion 78 of the upper retainer 76 of the elastic assembly 24. The steel washers 90 are used as spacers in the vertical adjusting means 26. In order to raise the vertical height of the wheel 20 with respect to the vehicle, more washers 90 are simply added to the assembly by unthreading the fastener 92 and adding additional washers 90 to the fastener 92. In order to lower the wheel 20, the fastener 92 is removed, and the desired number of washers 90 are removed from the fastener 92. This provides an easy and simple manner in which to adjust the vertical height of the wheel 20 of the caster wheel apparatus 10 without having to fully disassemble and re-assemble the caster wheel apparatus 10.

Figure 4:
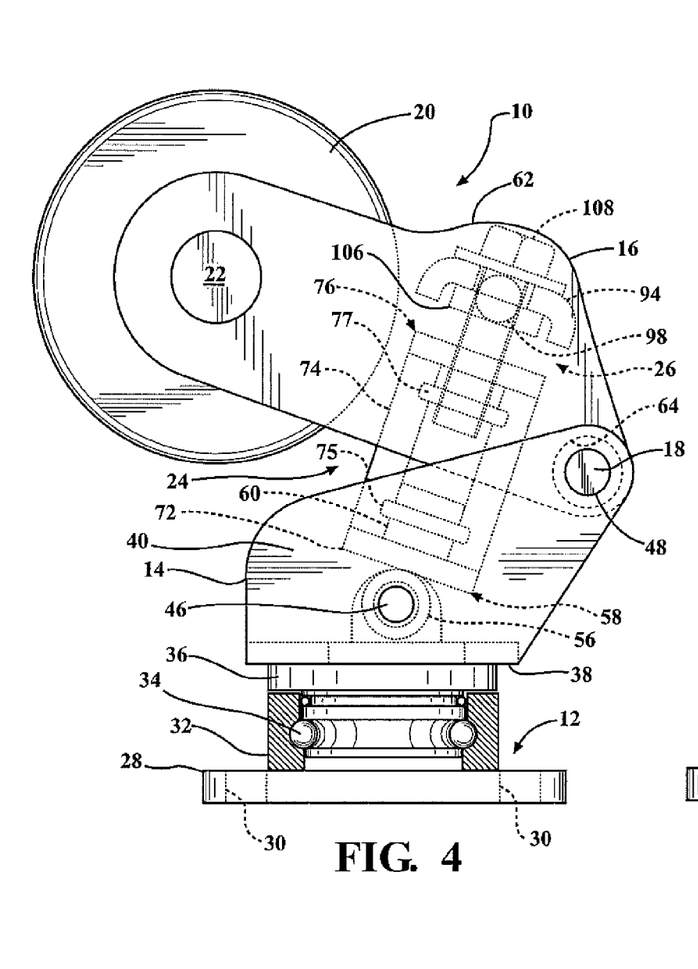
FIG. 4 is a front plan view of the caster wheel apparatus of the present invention showing a second embodiment of the vertical height adjusting means.
Figure 5:
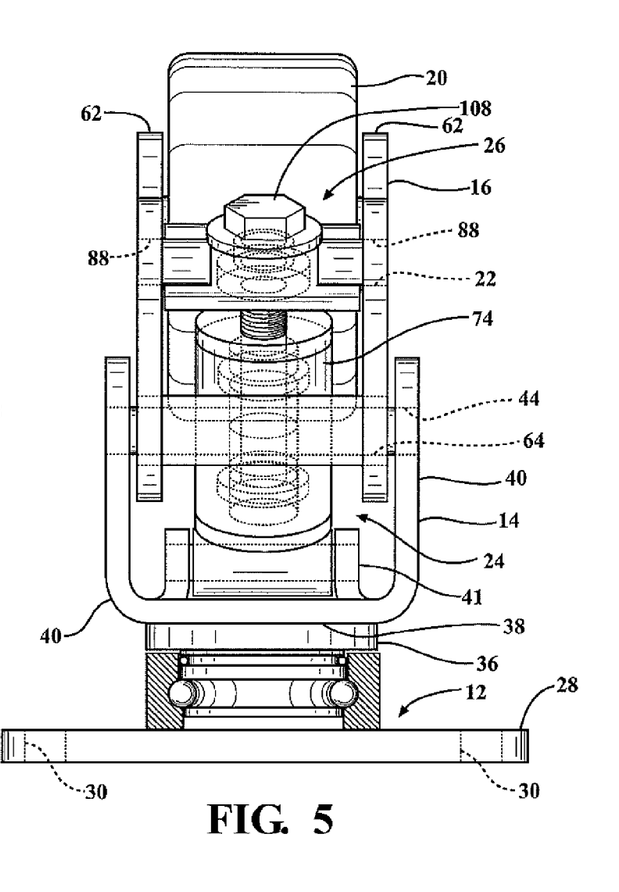
FIG. 5 is a plan side view of the caster wheel apparatus of the present invention showing the second embodiment of the vertical height adjusting means.
Figure 6:
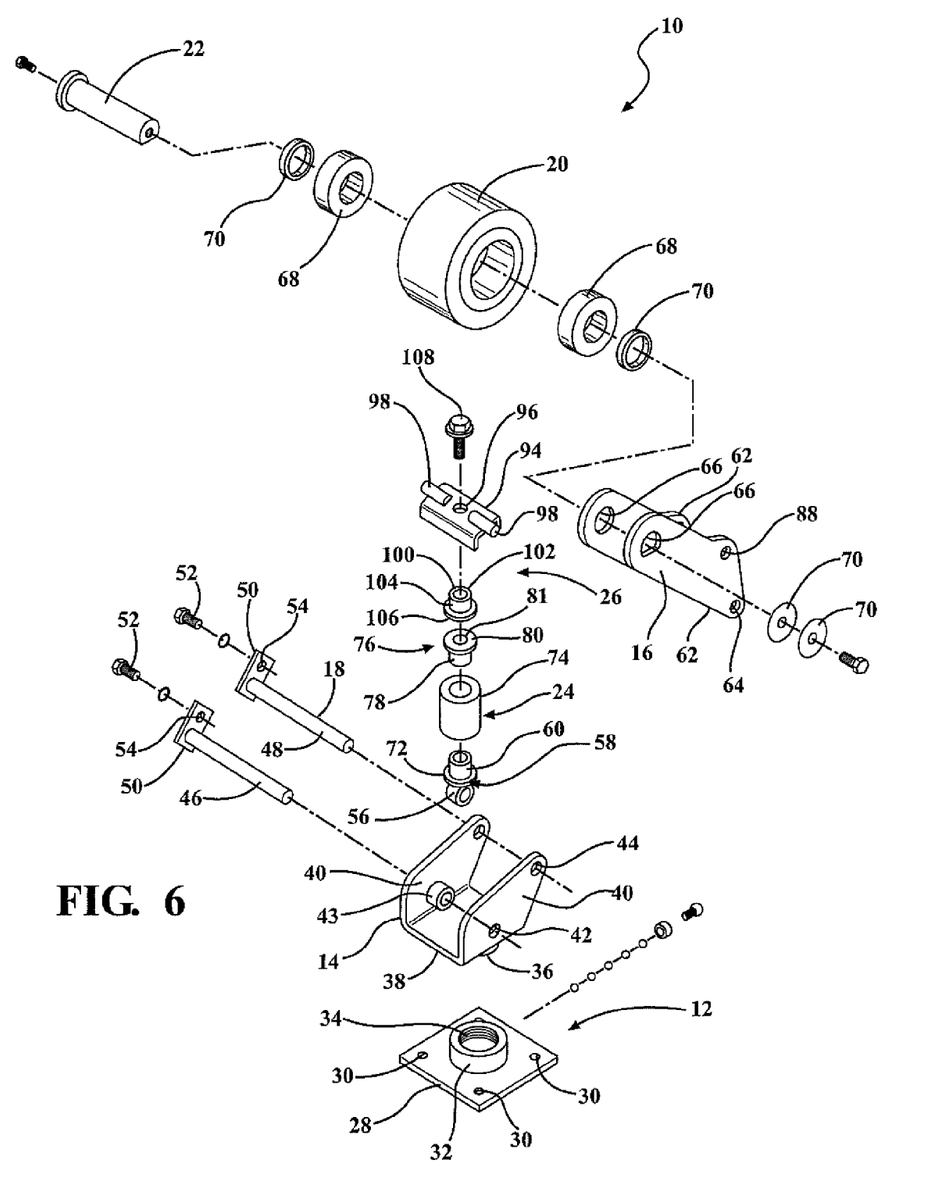
FIG. 6 is an exploded view of the caster wheel apparatus of the present invention showing the second embodiment of the vertical height adjusting means.
Figure 7:
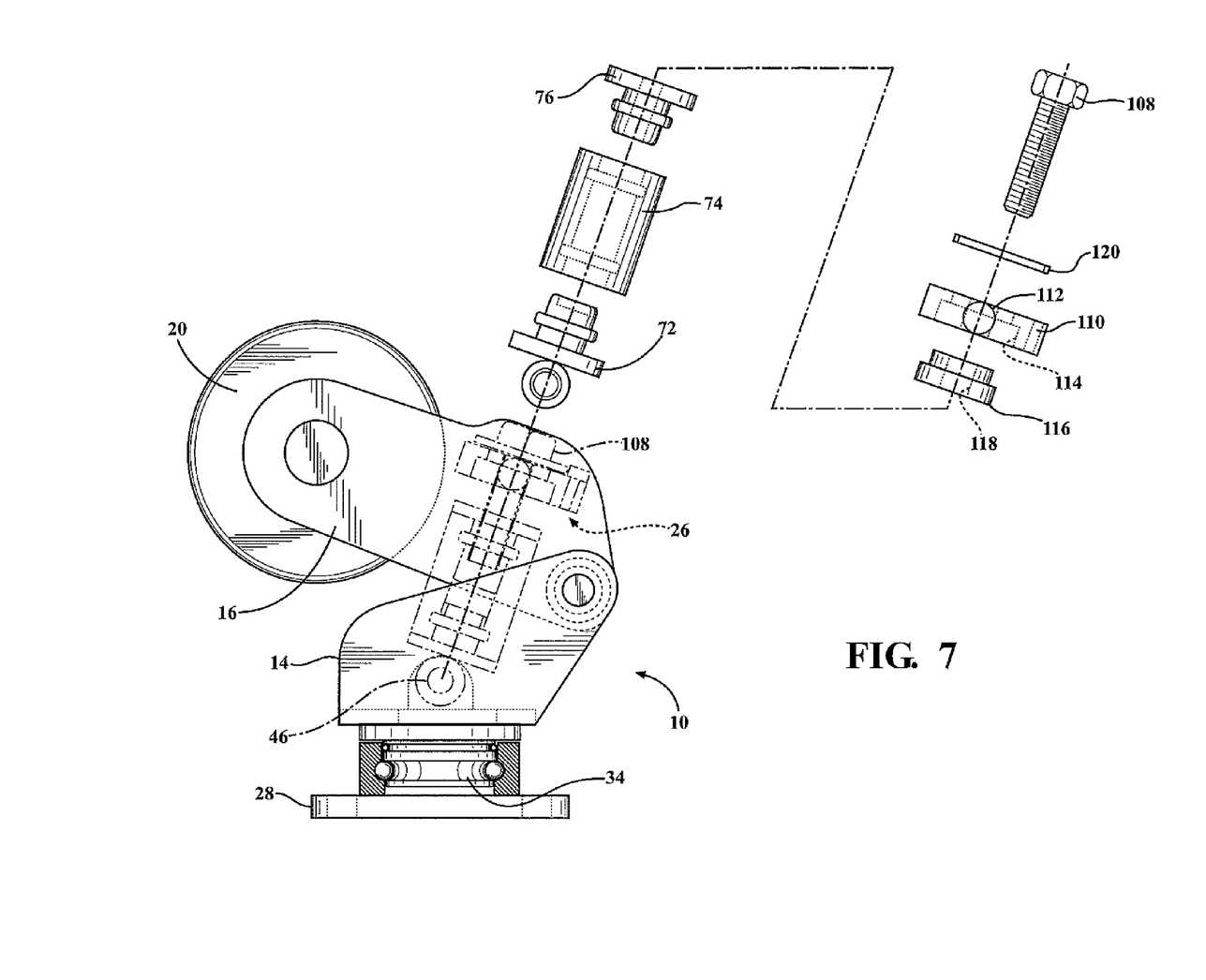
FIG. 7 is an exploded view of the caster wheel apparatus of the present invention showing the set screw for locking the threaded fastener.
Figure 8:
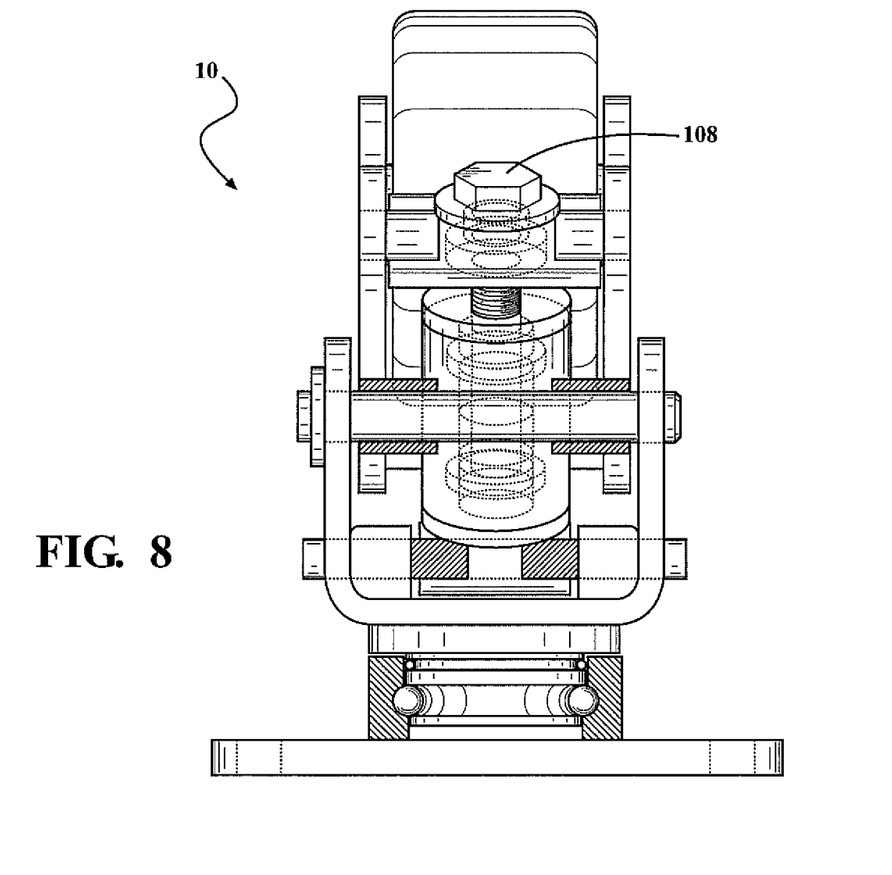
FIG. 8 is a plan side view of the caster wheel apparatus of the present invention having the set screw for locking the threaded fastener.

The vertical adjusting means 26 may also take on a different structure, as shown in the second embodiment of the present invention in FIGS. 4-6. In this embodiment, the vertical adjusting means 26 provides a floating retainer 94 having a substantially U-shaped plate-like configuration with a threaded aperture 96 extending therethrough. A pair of substantially cylindrical rods 98 are integrally connected to and extend outwardly from the floating retainer 94. The rods 98 of the floating retainer 94 are received by the coaxial apertures 88 provided in the plates 62 of the wheel frame 16. This allows the elastic assembly 24 to pivot with respect to the wheel frame 16. A swivel lock nut 100 having a threaded aperture 102 extending therethrough is aligned with and connected to the underside of the floating retainer 94 in the upper retainer 76 of the elastic assembly 24. The swivel lock nut 100 has a similar configuration to that of the upper retainer 76 wherein a substantially cylindrical portion 104 is connected to a broader cylindrical base 106. A threaded fastener 108 is threaded through the aperture 96 provided in the floating retainer 94 and through the threaded aperture 102 provided in the swivel lock nut 100 and the threaded aperture in the upper retainer 76. The swivel lock nut 100 and the floating retainer 94 allow the threaded fastener 108 to be threaded in and out of the vertical adjustment means 26, thereby adjusting the vertical height of the wheel 20 by adjusting the angle between the wheel frame 16 and the yolk frame 14. This particular embodiment has the advantage of not having to remove the fastener 108 from the caster wheel apparatus 10, but rather, the vertical height of the wheel 20 may be adjusted by simply turning the fastener 108 of the vertical adjustment means 26.

Figure 9:
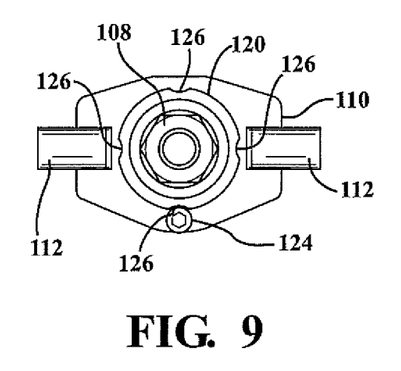
FIG. 9 is a top plan view of the set screw in the floating retainer of the caster wheel apparatus of the present invention.
Figure 10:
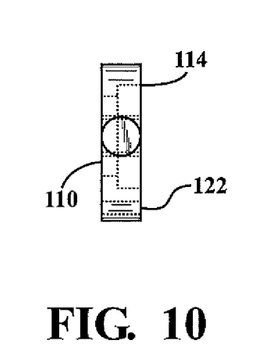
FIG. 10 is a plan side view of the floating retainer for receiving the set screw of the caster wheel apparatus of the present invention.

In order to prevent the threaded fastener 108 from rotating undesirably, the threaded fastener 108 may be locked in a set position, as shown in FIGS. 7-10. In this embodiment, the caster wheel apparatus 10 is similar to the embodiment described in FIGS. 4-6; however, the adjusting means 26 provides a floating retainer 110 having a plate-like configuration with a pair of rods 112 extending from each side of the floating retainer 110. The rods 112 engage the apertures 88 in the wheel frame 16, as previously described. The floating retainer 110 has a stepped inner aperture 114 for matingly receiving a swivel lock nut 116 having a stepped outer diameter that is connected to the floating retainer 110. The swivel lock nut 116 has a threaded aperture 118 extending there through for threadably receiving the threaded fastener 108. A washer 120 is connected to the underside of the head of the threaded fastener 108 such that the washer 120 abuts the floating retainer 110 when the threaded fastener 108 is fully threaded into the threaded aperture 118 of the swivel lock nut 116. The floating retainer 110 also has a threaded aperture 122 extending through one side of the floating retainer 110. The threaded aperture 122 threadably receives a set screw 124, wherein the head of the set screw 124 engages an arcuate recess 126 provided on an outer circumference of the washer 120. The washer 120 may have numerous arcuate recesses 126 formed on the washer 120. FIG. 9 shows four arcuate recesses 126 spaced at 90° degree intervals on the washer 120; however, the present invention anticipates different positions and intervals of the arcuate recesses 126 on the washer 120. When the set screw 124 engages one of the arcuate recesses 126 formed on the washer 120, the washer 120 and the threaded fastener 108 are prohibited from rotating thereby locking the threaded fastener 108 and the adjusting means 26 into a set position. This is defined as the locked position. To adjust the vertical height of the wheel 20, the set screw 124 is loosened or threaded away from the floating retainer 110 such that the head of the set screw 124 no longer engages the arcuate recess 126 formed in the washer 120. This allows the threaded fastener 108 to turn thereby adjusting the vertical height of the wheel 20. This is defined as the unlocked position. Once a desired position of the wheel is achieved, the set screw 124 is threaded back into the floating retainer 110 so as to engage one of the arcuate recesses 126 in the washer 120 thereby locking the wheel 20 in a set position.

In use, the caster wheel apparatus 10 of the present invention is mounted to a vehicle by mounting the mounting plate 28 of the swivel bearing assembly 12 to the vehicle through the use of conventional fasteners. In the first embodiment, the vertical height of the wheel 20 may be adjusted by removing the fastener 92 and inserting or removing washers 90 between the swivel plate 82 and the upper retainer 76. Once the proper number of washers 90 are in place, the fastener 92 is threaded back into the vertical adjusting means 26. In the second embodiment, the vertical height of the wheel 20 is adjusted by simply threading the fastener 108 into or out of the vertical adjusting means 26 until the wheel 20 has reached the desired height. In an additional embodiment, the set screw 124 may be utilized to prevent the threaded fastener 108 from rotating thereby locking the vertical height of the wheel 20 into position.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vertically adjustable caster wheel apparatus comprising:
    a yolk frame having a pivot pin connected to and extending through said yolk frame;
    a wheel frame having one end pivotally connected to said yolk frame and a second end rotatably connected to a wheel;
    an elastic member having a first retainer connected to one end of said elastic member and a second retainer connected to an opposite end of said elastic member, wherein said first retainer is connected to said pivot pin of said yolk frame to allow said elastic member to pivot with respect to said yolk frame; and
    means for adjusting the vertical height of said wheel by adjusting the angle of said wheel frame relative to said yolk frame.

2. The caster wheel apparatus as stated in claim 1, said adjusting means further comprising:
    said second retainer having a threaded aperture extending there through along a longitudinal axis;
    a swivel plate coupled to said wheel frame and having a threaded aperture extending there through and coaxial with said longitudinal axis;
    a threaded fastener releasably engaging said threaded aperture in said swivel plate and said threaded aperture in said second retainer; and
    a spacer positioned between said second retainer and said swivel plate for adjusting the vertical height of said wheel by adjusting the angle of said wheel frame relative to said yolk frame.

3. The caster wheel apparatus as stated in claim 2, said spacer further comprising:
    at least one washer having an aperture for receiving said threaded fastener.

4. The caster wheel apparatus as stated in claim 2, further comprising:
    said swivel plate having a pair of rods received by a pair of apertures in said wheel frame to allow rotation of said swivel plate relative to said wheel frame.

5. The caster wheel apparatus as stated in claim 1, said adjusting means further comprising:
    said second retainer having a threaded aperture extending there through along a longitudinal axis;
    a floating retainer coupled to said wheel frame and having a threaded aperture extending there through coaxial with said longitudinal axis;
    a lock nut connected to said floating retainer and having a threaded aperture coaxial with said longitudinal axis; and
    a threaded fastener received by said threaded aperture in said floating retainer, said lock nut, and said second retainer, wherein said threaded fastener may be rotated to adjust the vertical height of said wheel by adjusting the angle of said wheel frame relative to said yolk frame.

6. The caster wheel apparatus as stated in claim 5, further comprising:
a set screw releasably received by a threaded aperture in said floating retainer, and said set screw movable between a locked position, wherein said set screw engages a recess in said threaded fastener to prevent said threaded fastener from rotating, and an unlocked position, wherein said set screw does not engage said recess in said threaded fastener thereby allowing said threaded fastener to rotate and adjust the vertical height of said wheel by adjusting the angle of said wheel frame relative to said yolk frame.

7. The caster wheel apparatus as stated in claim 5, further comprising:
said floating retainer having a pair of rods received by a pair of apertures in said wheel frame to allow rotation of said floating retainer relative to said wheel frame.

8. The caster wheel apparatus as stated in claim 1, further comprising:
a swivel bearing assembly coupled to said yolk frame for rotatably supporting said yolk frame.

9. The caster wheel apparatus as stated in claim 1, further comprising:
said elastic member fabricated from a polyurethane material.

10. The caster wheel apparatus as stated in claim 1, said elastic member further comprising:
at least one substantially cylindrical polyurethane tube.

11. The caster wheel apparatus as stated in claim 1, further comprising:
said elastic member having a substantially cylindrical configuration having an aperture extending there through along a longitudinal axis;
said first retainer received by said aperture at one end of said elastic member and said second retainer received by said aperture at said opposite end of said elastic member; and
said first retainer and said second retainer spaced in said aperture of said elastic member when said elastic member is not extensively compressed, and said first retainer and said second retainer engaging one another in said aperture of said elastic member when said elastic member is extensively compressed.

12. The caster wheel apparatus as stated in claim 11, further comprising:
said first retainer and said second retainer each having an annular protuberance extending therefrom, and said first retainer and said second retainer having said annular protuberance press fit into said aperture of said elastic member to prevent the movement of said elastic first retainer and said second retainer relative to said elastic member.

13. A vertically adjustable caster wheel apparatus, comprising:
a yolk frame having a first pivot pin connected to and extending through said yolk frame;
a wheel frame having one end pivotally connected to said yolk frame via a second pivot pin and a second end rotatably connected to said wheel;
a substantially cylindrical polyurethane tube having an aperture extending there through along a longitudinal axis;
a first retainer received by said aperture at one end of said polyurethane tube, and a second retainer received by said aperture at an opposite end of said polyurethane tube, wherein said first retainer is connected to said first pivot pin of said yolk frame to allow said polyurethane tube to pivot with respect to said yolk frame; and
means, connected to said second retainer and said wheel frame, for adjusting the vertical height of said wheel by adjusting the angle of said wheel frame relative to said yolk frame.

14. The caster wheel apparatus as stated in claim 13, wherein said adjusting means further comprises:
said second retainer having a threaded aperture extending there through coaxial with said longitudinal axis;
a swivel plate having a threaded aperture extending there through coaxial with said longitudinal axis, and said swivel plate having a pair of rods received by apertures in said wheel frame for allowing rotation of said swivel plate relative to said wheel frame;
a threaded fastener releasably engaging said threaded aperture in said swivel plate and said threaded aperture in said second retainer; and
a spacer replaceably positioned between said retainer and said swivel plate for adjusting the vertical height of said wheel by adjusting the angle between said yolk frame and said wheel frame.

15. The caster wheel apparatus as stated in claim 13, wherein said adjusting means further comprises:
said second retainer having an aperture extending there through coaxial with said longitudinal axis;
a floating retainer having a threaded aperture extending there through coaxial with said longitudinal axis and having a pair of rods received by a pair of apertures in said wheel frame for allowing said floating retainer to rotate relative to said wheel frame;
a lock nut connected to said floating retainer and having a threaded aperture coaxial with said longitudinal axis; and
a threaded fastener adjustably received by said threaded aperture in said floating retainer, said lock nut, and said second retainer, wherein said threaded fastener may rotate to adjust the vertical height of said wheel by adjusting the angle between said yolk frame and said wheel frame.

16. The caster wheel apparatus as stated in claim 15, further comprising:
a set screw releasably received by a threaded aperture in said floating retainer, and said set screw movable between a locked position, wherein said set screw engages a recess in said threaded fastener to prevent said threaded fastener from rotating, and an unlocked position, wherein said set screw does not engage said recess in said threaded fastener thereby allowing said threaded fastener to rotate and adjust the vertical height of said wheel by adjusting the angle of said wheel frame relative to said yolk frame.

* * * * *

UNITED STATES PATENT AND TRADEMARK OFFICE
CERTIFICATE OF CORRECTION

| | | |
|---|---|---|
| PATENT NO. | : 8,839,487 B2 | Page 1 of 1 |
| APPLICATION NO. | : 14/058861 | |
| DATED | : September 23, 2014 | |
| INVENTOR(S) | : Plate | |

It is certified that error appears in the above-identified patent and that said Letters Patent is hereby corrected as shown below:

In the Specification

In Col. 4, line 46, delete "7-shaped" and insert -- J-shaped --.

Signed and Sealed this
Twenty-fourth Day of February, 2015

Michelle K. Lee
*Deputy Director of the United States Patent and Trademark Office*